Oct. 12, 1937.  A. G. O. J. MELCHIOR  2,095,569
SHOCK ABSORBER
Filed Jan. 18, 1933   3 Sheets-Sheet 1
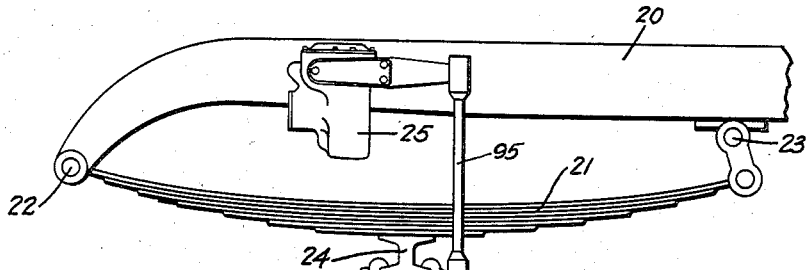
Fig. 1.
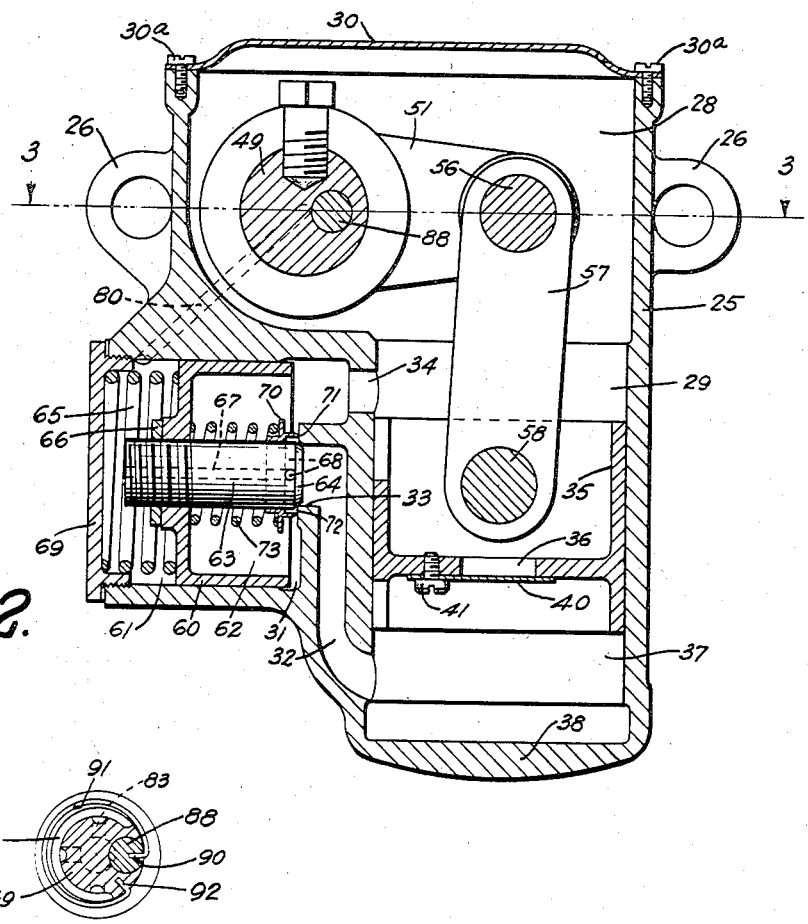
Fig. 2.
Fig. 4.
INVENTOR
Alexander G. O. J. Melchior
BY
Spencer, Hardman and John
ATTORNEYS

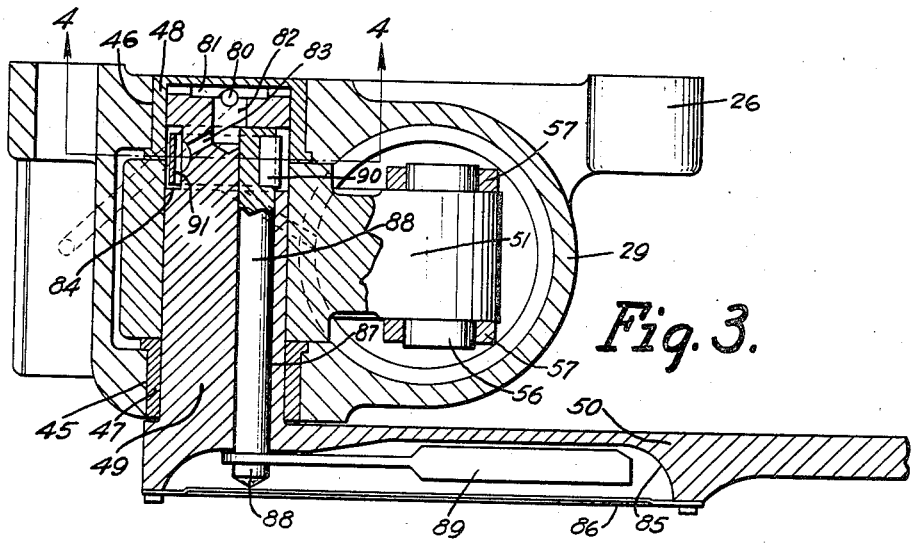
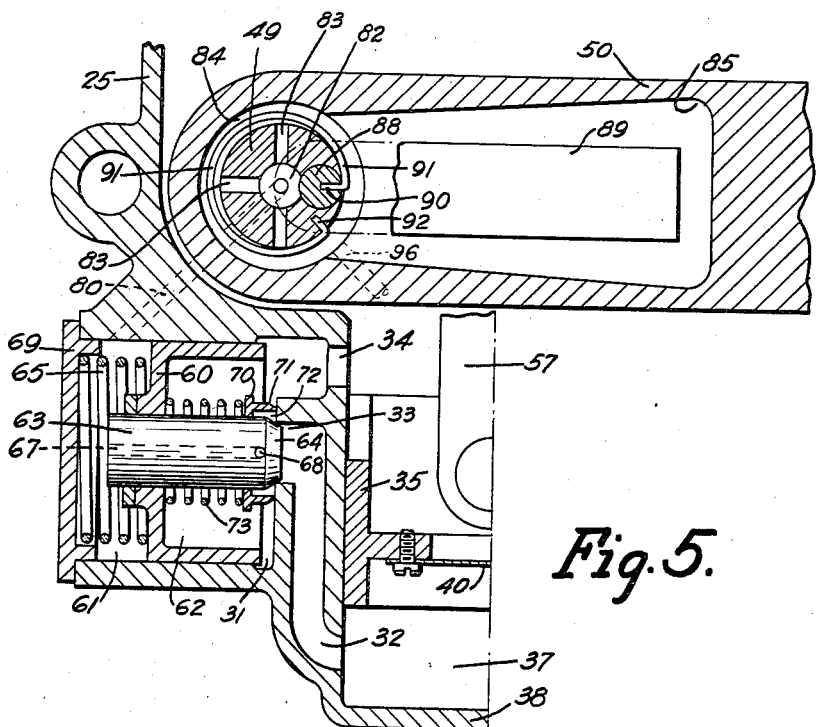

Oct. 12, 1937.  A. G. O. J. MELCHIOR  2,095,569
SHOCK ABSORBER
Filed Jan. 18, 1933    3 Sheets-Sheet 3
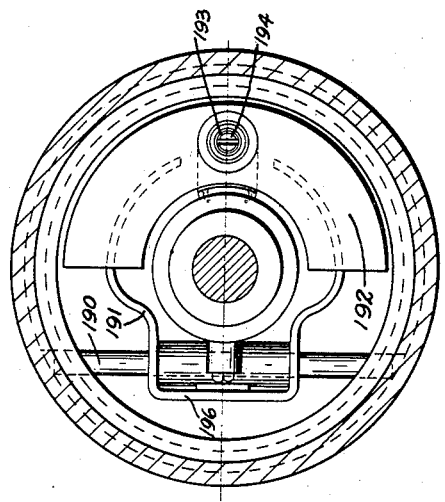
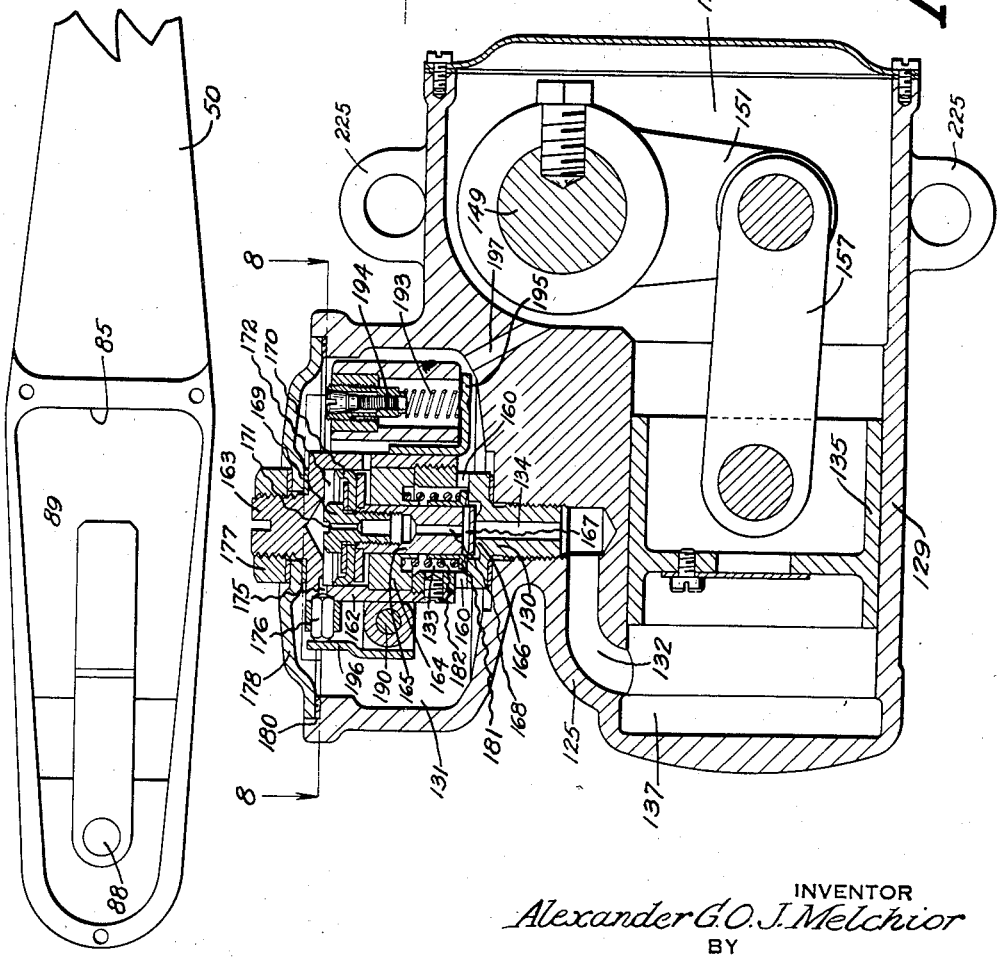
INVENTOR
Alexander G. O. J. Melchior
BY
Spencer, Hardman and Ihe
ATTORNEYS Patented Oct. 12, 1937

2,095,569

UNITED STATES PATENT OFFICE 2,095,569

SHOCK ABSORBER

Alexander G. O. J. Melchior, Recklinghausen, Germany, assignor to General Motors Corporation, Detroit, Mich., a corporation of Delaware Application January 18, 1933, Serial No. 652,302

22 Claims. (Cl. 188—88)

This invention relates to improvements in shock absorbers particularly adapted for use on power-driven vehicles.

It is among the objects of the present invention to provide a shock absorber adapted automatically to adjust itself in accordance with the nature of the roadbed over which the vehicle is being operated.

A further object of the invention is to provide a shock absorber adapted automatically to adjust itself in response to accelerative movements of that part of the vehicle to which the shock absorber is attached, whereby the resistance of the shock absorber to the body and axle movements is determined in proportion to the accelerative movements of the shock absorber itself.

A further object of the invention is the utilization of power developed within the shock absorber for adjusting said shock absorber, the application of said power being controlled in response to and proportionate with the accelerative movements of that part of the vehicle to which the shock absorber is attached.

A still further object of the invention is to provide a shock absorber automatically adjustable in response to accelerative movements of the frame of the vehicle which supports the body of the vehicle.

Further objects and advantages of the present invention will be apparent from the following description, reference being had to the accompanying drawings wherein a preferred embodiment of one form of the present invention is clearly shown.

In the drawings:

Fig. 1 is a fragmentary sectional view of an automobile chassis showing a shock absorber, provided with the present invention, applied thereto.

Fig. 2 is a vertical sectional view taken through the shock absorber to show interior constructions.

Fig. 3 is a transverse sectional view taken through the shock absorber substantially along the line 3—3 of Fig. 2.

Fig. 4 is a detail sectional view of the valve mechanism taken substantially along the line 4—4 of Fig. 3.

Fig. 5 is a fragmentary sectional view in diagrammatic form, similar to Fig. 2, with the inertia mass controlled valve shown in section.

Fig. 6 is a detail view of the operating arm of the shock absorber.

Fig. 7 is a longitudinal sectional view of a modified form of shock absorber.

Fig. 8 is a detail view taken substantially along the line 8—8 of Fig. 7.

Referring to the drawings and particularly to Fig. 1 thereof, the numeral 20 designates the frame of the vehicle upon which the body of the vehicle is supported. This frame has springs 21 hingedly attached thereto as at the points 22 and 23 respectively. Springs 21 are supported upon an axle 24 which in turn has the vehicle wheels attached thereto, said wheels not being shown in the present drawings for the sake of clearness.

The shock absorber comprising a casing 25 has perforated ears 26 for receiving bolts by which the casing is secured to the frame 20 of the vehicle. This casing 25 provides a fluid reservoir 28 and a cylinder 29, the reservoir having a cover 30 which is attached to the casing by means of screws 30a.

Casing 25 also provides a fluid receiving chamber 31 which is in communication with the cylinder 29 through a duct 32, the end of said duct opening into the cylinder 29 adjacent the bottom thereof as shown in Fig. 2, the opposite end of said duct opening substantially centrally into the fluid receiving chamber 31, this opening being termed port 33. A passage 34 in the wall of the casing provides communication between the fluid receiving chamber 31 and the upper end of the cylinder 29.

Within the cylinder there is provided a piston 35 having a port 36 which furnishes communication between the compression chamber 37 formed in the cylinder between the piston and the closed end 38 thereof and the fluid reservoir 28. Any suitable fluid flow control device is provided for port 36, this device acting to permit a substantially free flow of fluid from the reservoir 28 through the piston port 36 into the compression chamber 37 as the piston 35 is moved upwardly or away from the closed end 38 of the cylinder. When the piston 35 moves in the opposite direction, however, that is toward the closed end 38 of the cylinder, this fluid flow control device should prevent a fluid flow from the compression chamber 37 through the port 36 into the reservoir 28.

For purposes of illustration applicant has shown a disc valve 40 normally held against the cylinder wall including port 36 by a screw 41. As the piston 35 moves upwardly, the fluid will urge the disc valve 40 away from the port 36 to establish a flow of fluid into the compression chamber 37, and on the other hand as the piston 35 moves downwardly toward the closed end wall 38 of the cylinder, valve 40 will be pressed upon the piston to close port 36.

Two aligned openings 45 and 46 are provided in the casing in which openings bearing members 47 and 48 are respectively located. These bearing members form journals for the shaft portion 49 of the operating arm 50. A rocker arm 51 is secured to the shaft 49, the free end of said rocker arm 51 carrying a pin 56 to which is pivotally attached one end of links 57, the opposite end of said links being secured to a cross pin 58 in the piston 35. From this it may be seen that oscillations of the operating arm 50 will result in rotation of its shaft portion 49 and consequently a rotation of the rocker arm 51, thus when the arm 50 is moved counter-clockwise as regards Figs. 1 and 2, piston 35 will be moved upwardly in cylinder 39, or more particularly away from the end wall 38 of said cylinder, while on the other hand if the operating arm 50 is oscillated clockwise then the piston 35 will be moved toward the end wall 38 of the cylinder thereby to exert a pressure upon any fluid within the compression chamber 37.

As the piston 35 is moved downwardly toward the end wall 38 of the cylinder and exerts a pressure upon the fluid within the chamber 37, said fluid will be forced from said compression chamber 37 through the duct or passage 32 out of the port 33 into the fluid receiving chamber 31. This fluid flow from port 33 must be controlled in order to have the shock absorber provide the proper resistance to the relative movements between the frame 20 and the axle 24 of the vehicle. In the present instance a valve piston 60 is slidably carried within the fluid receiving chamber 31, said piston dividing this chamber into two compartments 61 and 62 respectively. Piston 60 adjustably carries a fluid flow control device in the form of a pin-valve 63, the free end of which is beveled as at 64 to provide a tapering, annular edge which is adapted to engage the annular edge of port 33 to close said port. An end cap 69 not only acts as a cover plate for the fluid receiving chamber 31, but also provides an abutment engaged by one end of a spring 65, the opposite end of said spring engaging the piston 60 yieldably urging it toward the port 33 and thus yieldably urging the tapered end of the pin valve 63 to close port 33. A lock nut 66 is provided on the threaded end of the valve extending beyond the back end of piston 60 so as to securely lock the pin valve 63 in properly adjusted position on the piston 60. If no adjustment between the piston 60 and valve 63 is desired, then said piston and valve might just as well be integral and as such would operate just as efficiently. The compartment 61 behind the piston 60, or more specifically between the piston 60 and the end cover plate 69, is in communication with compartment 62 through a duct or passage 67 in the pin valve 63.

As will be noted in Figs. 2 and 5, passage 67 does not extend completely to the tapered end of valve 63, but terminates short thereof so as not to communicate directly with the port 33. However, in this case side passages 68 are provided communicating with the central passage 67 and thus causing communication between compartments 61 and 62 and not between compartment 61 and the passage 32 directly.

A control check valve 70 is slidably carried upon the pin valve 63, this check valve having an annular extension 71, the inner diameter of which is greater than the outer diameter of valve 63 so as to provide a chamber 72 clearly shown in Figs. 2 and 5. The outer peripheral edge of the annular extension 71 is yieldably urged into engagement with the flat wall surface surrounding port 33 by a spring 73 interposed between the piston 60 and valve 70. From this it may be seen that no communication between passage 32 and compartments 62 and 61 of the fluid receiving chamber 31 is completed until valve 63 is first moved from its seat by fluid pressure from the compression chamber 37 through duct 32 to open port 33. After the valve 63 has been moved to open port 33, fluid pressure will be exerted upon valve 70, moving it against spring 73 so that the annular extension 71 of said valve is moved from engagement with the wall thereby to establish communication between chamber 72 and compartment 62, thus permitting fluid to flow from port 33 past the valves 63 and 70 into the compartment 62 and thence through the opening 34 into the reservoir 28. Valve 70 will maintain a pressure within chamber 72 sufficient to urge fluid through the side passages 68 and longitudinal passage 67 into the compartment 61 from which compartment said fluid will flow through the passage 80 shown in dotted lines in Figs. 2 and 5 to the inertia mass controlled valve, which will now be described.

Referring particularly to Figs. 2, 3, and 5 and at this instant to Fig. 3, it may be seen that between the inner end of shaft portion 49 of arm 50 and the end wall of bearing 48 there is provided a chamber 81 in communication with the compartment 61 aforedescribed by the passage 80 shown in dotted lines. A central bore 82 in the shaft 49 leads from chamber 81, and side passages 83 from the central bore 82 lead into an annular groove 84 provided in the shaft 49.

In the operating arm or lever 50 of the shock absorber there is provided a recess 85, a cover plate 86 sealing this recess. Eccentrically of shaft 49 there is provided a longitudinal passage 87 in which a shaft 88 is rotatably supported, a portion of the shaft extending into the recess 85 having the inertia mass 89 attached thereto in any suitable manner. One end 90 of a blade-spring valve 91 shown in the form of a ring, is anchored to the eccentrically supported shaft 88 as shown in Figs. 3, 4 and 5 while the other end 92 is anchored to the rotatable shaft 49. Ordinarily, as is shown in Figs. 4 and 5, this blade-spring valve 91 has its portion, intermediate the anchored ends thereof, spaced from the shaft, however upon clockwise rotation of the eccentrically supported shaft 88, blade-spring 91 is tightened or wound about the shaft 49 so as to move toward and engage shaft 49 and thus close the annular groove 84 into which the transverse passages 83 lead from the communicating chambers 81 and 82. From this it may be seen that fluid flow from compartment 61 through passage 80, chambers 81 and 82 to the annular groove 84 in shaft 49 is substantially restricted in response to accelerative movements upwardly of the shock absorber casing. These accelerative movements upwardly result in a clockwise rotation of the eccentric shaft 88 by the inertia mass 89 to draw the spring-blade valve 91 upon shaft 49 to shut off the annular duct 84.

The device so far described operates in the following manner:

When the vehicle is being operated over a highway and an obstruction is met by a road wheel, the axle 24 is thrust upwardly toward the frame 20 resulting in a compression of the adjacent vehicle spring 21. The link 95, one end of which is connected to the axle the other to the free end of the operating arm 50 of the shock absorber, will transmit this movement to said arm 50, thus rotating it in a counterclockwise direction which results in a similar rotation of the shaft 49, the rocker arm 51 carried thereby and the links 57 which attach piston 35 to said arm 51. This upward movement of the piston 35 will cause the fluid in the reservoir 28 to open valve 40 thereby to establish a substantially free flow of fluid through the piston port 36 into the compression chamber 37. From this it may be seen that compression movements of the vehicle springs are substantially unresisted by the present form of shock absorber.

The spring 21, having reached the limit of its compression in response to the particular obstruction being met, will, if uncontrolled, return to normal load position with a rebounding movement. This rebounding movement exerts an upward thrust upon the frame 20 which, as has been mentioned heretofore, supports the vehicle body. If this upward thrust, or more particularly, the rebounding movement of the spring is not resisted, disagreeable jars and jolts will be transmitted to the occupants of the vehicle.

When moving away from the vehicle frame 20 during its rebounding movement, spring 21 moves the axle 24 in the same direction, or, the frame 20 is thrust upwardly resulting in a clockwise rotation of the shock absorber shaft 49 and its attached rocker arm 51. This results in a thrust of piston 35 downwardly into its cylinder and consequently a pressure will be exerted upon the fluid within the compression chamber 37. This pressure, if sufficient to move valve 63 against the effect of spring 65 will consequently establish a flow of fluid from the port 33 of duct 32 against valve 70, which, when moved by this fluid pressure against the effect of its spring 73, will establish a flow into compartment 62, thence through passage 34 into the reservoir 28. This flow just described may be termed the main fluid flow. As has been mentioned heretofore, provision of valve 70 causes a secondary flow to be established through cross passages 68 in valve 63 through the longitudinal passage 67 thereof into the compartment 61 thence through duct 80 into chamber 81 then into the recess 82 in shaft 49 thence through cross passages 83 into the annular groove 84 from which the fluid will flow through a passage 96 back to the reservoir.

The upward thrust of rebounding springs 21 will, if of sufficient magnitude, move the body carrying frame 20 upward with an accelerated rate and, due to the fact that the shock absorber casing 25 is attached to said frame 20, will result in a movement of shaft 88 clockwise relative to shaft 49 for, as has been mentioned heretofore, inertia mass 89 is attached to shaft 88 and the inertia mass will tend to remain immovable and not be thrust upwardly with the casing 25 of the shock absorber. Due to this movement of the eccentrically mounted shaft 88, spring-blade valve 91 will be drawn against the shaft 49 to close the annular groove 84 thereof and thus restrict the flow from said groove 84. This restriction to the flow of fluid from the annular groove 84 is proportionate to the rate of accelerative movement of the casing upwardly. It may clearly be seen that if the rate of acceleration upwardly of the shock absorber casing 25 is comparatively high, then the force with which the spring-blade valve 91 is drawn against the shaft will be comparatively large, while on the other hand if the accelerative movement of the shock absorber casing 25 upwardly is comparatively low, then the spring-blade valve 91 will not be drawn against the shaft 49 to close annular passage 84 with as great a force.

From this it may be seen that the flow of fluid from compartment 61 is consequently restricted proportionately to the accelerative movements upwardly by the vehicle frame 20 and consequently the shock absorber casing 25, thereby building up a pressure within the chamber or compartment 61, which pressure will move the valve-carrying piston 60 forwardly, toward the port 33 and thus the tapered end 64 of valve 63 will restrict the main flow in proportion to the pressure build-up within the compartment 61. In the present invention the shock absorber has an unbalanced, pressure operated valve which comprises two portions, namely, a valve stem portion and a piston portion, the latter adjustably carried by the former. These two portions provide surfaces of different areas upon which fluid pressure is exerted to control the main fluid flow. An inertia mass controlled valve determines the fluid pressure acting upon the larger valve portion which pressure adjusts said valve to restrict the main flow. It will be seen that the area of valve portion 63 exposed to the fluid pressure in duct 32, or more particularly at port 33, is comparatively less than the area of the piston portion 60 exposed to the fluid pressure within the compartment 61, yet the pressure at port 33 is comparatively greater than the pressure at any time within the compartment 61; however, the area of piston portion 60, being so much greater than the area of the end of valve portion 63, permits said valve portion 63 to be moved by this lesser pressure against the greater pressure in duct 62 to control the fluid flow from said duct. Thus it may be seen that the effect of a lower pressure upon the valve portion 60 is multiplied, due to its greater area, to overcome a greater pressure and consequently the valve may be termed a "multiplying valve". The valve 70 is provided to maintain the pressure in the chamber 61 within a predetermined limit, dependent of course upon the adjustment of the spring-blade valve 91.

Referring now to Figs. 7 and 8 in which a modified form of shock absorber is illustrated, the numeral 125 designates the casing of this shock absorber which casing has apertured ears 225 extending therefrom, for receiving bolts by which said shock absorber may be attached to the frame 20 of the vehicle in a position similar to the one shown in Fig. 1. In this case, however, the axis of the cylinder is parallel to the frame 20 and not arranged vertically as shown in this figure. The casing 125 provides a fluid reservoir 128 and a cylinder 129 in which a piston 135 is reciprocably supported and operated in a manner similar to that in the main construction. Here a rocker shaft 149 has an arm 151 attached thereto which in turn is connected with the piston 135 through links 157. The shaft 149 extends outside the casing and has the operating arm somewhat similar to 50 secured thereto in any suitable manner. In this construction arm 50 is not recessed to provide a housing for the inertia mass. A chamber 131 is provided by the casing in which the control mechanism of the shock absorber is housed. This casing is in communication with the compression chamber 137 of the cylinder through the duct 132, the end of said duct adjacent the chamber 131 being provided with screw threads to receive the threaded tubular extension of the member 130. The portion of member 130 extending into the chamber 131 is enlarged and cup-shaped, providing a recess 133 which communicates with passage 134 leading into the duct 132. Cross passage 160 connects the bottom of the recess 133 and the chamber 131. Screw threads provided on the outer peripheral surface of the enlarged portion of the member 130 receive the cylinder member 162 which has a closed end provided with a central projection 163. In this cylinder there is provided a central block or wall 164, being apertured centrally to form a guide in which the valve 165 is adapted to slide. This valve 165 normally rests upon a valve seat 166 formed on the shoulder between the passage 134 in member 130 and the recess 133 thereof. A cross passage 167 in said valve is adapted to communicate with the cross passages 160 in the member 130 and a longitudinal passage 168 provides communication between the cross passage 167 in the bottom end of valve 165 and a counterbored recess at the upper end of the valve, which recess is interiorly threaded. Into this recess a screw 169 is threaded, the head of said screw clamping a fibrous piston washer 170 between adjacent metal washers, which piston washer is slidable within the cylindrical member 162. Screw 169 has a central passage therethrough, restricted as at 171, this passage together with the passage 168, in the valve member 165, providing communication between the cross passage 167 in the valve and the chamber 172 within the cylindrical member 162 above piston 170. A duct 175 in the cylindrical member 162 leads from the chamber 172 into the chamber 131, a valve 176 being slidably supported in an extension on member 162 and being adapted to control the fluid flow from the duct 175. Central extension 163 in the cylindrical member 162 receives a nut 177 for clamping a cover 178 in proper position so as to close and seal the chamber 131, the outer peripheral edge of this cover being seated upon a gasket provided in an annular groove 180 of the casing wall forming chamber 131. A sleeve valve 181 is slidably carried upon the portion of the valve 165 extending into the recess 133, this sleeve valve being urged by a spring 182 upon the shoulder provided in member 130.

A cross pin 190, supported in chamber 131, pivotally supports a bracket 191 to which the inertia mass 192 is anchored. This inertia mass is yieldably maintained in proper position within chamber 131 by a spring 193, which is interposed between a screw 194 adjustably carried by the inertia mass 192 and a bracket 195 fixed to a stationary cylindrical member 162 in any suitable manner. A finger 196 on the bracket 191 is adapted to be engaged by valve 176 so that when the inertia mass 192 is in normal position the engagement of the valve 176 with finger 196 will so position the valve that fluid may flow freely from the duct or passage 175 into the chamber 131 from which chamber it may flow back to the fluid reservoir 128 through a passage 197.

In this construction, certain elements are comparable with the elements of the original construction shown in Fig. 2, for instance: valve 165 is similar to valve 63, both valves having cross passages in communication with a longitudinal passage which leads to a compartment back of the piston. In the modified construction this compartment is designated by numeral 172 back of piston 170, while in the main construction it is designated by numeral 61 back of piston 60. The flow of fluid from the rear compartment 172, or in the original construction 61, is controlled by an inertia mass controlled valve, in the modified form designated by the numeral 176, in the original construction by the numeral 91. In the modified form the inertia mass 192 is mounted directly in the shock absorber casing while in the original construction the inertia mass is mounted within compartment 85 provided in the operating arm 50. The modified form shows a more compact structure than does the original construction, however, in both instances the inertia mass acts in response to accelerative movements of the shock absorber carrying portion of the vehicle to restrict fluid flow from the chamber behind the control piston 170, or 60 in the respective constructions. The sleeve-type check valve 181 in the modified form is comparable to the check valve 70 in the original form and is adapted to limit the pressure build-up within the chamber 172 as does valve 70 within the chamber 61. In both instances it is necessary to move the main valve either 165 or 63 in order to establish the secondary flow into the rear compartment behind the piston, these compartments being designated 172 and 61 in the modified and original constructions respectively.

It will be seen that, in response to fluid pressure from chamber 137 through duct 132, valve 165 will be lifted and thereafter valve 181 so as to establish a flow from the passage 134 in member 130 through cross passages 160 into the chamber 131. This established flow will in turn establish the secondary flow through cross passage 167 in valve 165 through its longitudinal passage 168 and thence through restricted passage 171 in the screw 169 into the chamber 172 behind piston 170. If the body carrying frame of the vehicle is not moving at a predetermined acceleration, then valve 176 may move into a position to permit fluid to escape freely from chamber 172 through duct 175 into the chamber 131 and thence through passage 197 to the fluid reservoir 128 and consequently no control effort upon the valve 165 increasingly to restrict the flow of fluid through ducts or passages 160 will obtain. However, if the body carrying frame of the vehicle moves upwardly at a predetermined accelerative rate, then the weight or inertia mass 192, tending to stand still, will cause valve 176 to be moved proportionately to restrict the flow of fluid through the passage 175, thereby causing a pressure to be built up in the chamber 172 and be exerted upon the comparatively large piston head 170 to move the valve 165 toward the seat 166 to restrict the flow of fluid from duct 132 through passage 134 into the chamber 131 through the closed passages 160. Restriction to the flow of fluid from duct or passage 175 is proportionate to the increase in the vertical velocity of the body or to the rate of change in the accelerative movements upwardly thereof and consequently if the body is moving extensively and at a high rate of acceleration, the inertia mass 192 will urge valve 176 greatly to restrict the flow of fluid from duct or passage 175.

It will of course be understood that the shock absorber will offer substantially no resistance to the compression movements of the springs 21, that is no resistance to their movements toward the frame 20, in which case the piston 35 is moved away from the closed end 38 of the cylinder and a substantially free flow of fluid is established from the reservoir 28 to the compression chamber 37; however, upon the rebound movement of the vehicle springs 21 in which they tend to throw the body carrying frame of the vehicle upwardly, the shock absorber will step in and offer resistance, this resistance varying in proportion to the pressure being exerted upon the fluid within compression chamber 37, or in proportion to the rate of acceleration at which the body carrying frame 20 of the vehicle is thrust upwardly.

In the present invention applicant has provided a self-adjusting shock absorber shown preferably in a hydraulic form, which is adapted automatically to adjust itself to offer resistance in accordance with the nature of the road over which the vehicle is being operated. This shock absorber resists the relative movements between the frame and axles of a vehicle for the purpose of providing a smooth and improved riding quality of the vehicle body which, as has been mentioned, is supported upon the frame of the vehicle. The shock absorber will control frame and body movements in accordance with their rate of acceleration, thus if the body is moving upwardly at a great rate, the shock absorber will offer a comparatively great resistance, while if the upward movement of the frame or body is negligible, then the resistance offered by the shock absorber will be substantially reduced.

While the form of embodiment of the present invention as herein disclosed constitutes a preferred form, it is to be understood that other forms might be adopted, all coming within the scope of the claims which follow.

What is claimed is as follows:

1. An hydraulic shock absorber comprising, in combination, a casing providing a cylinder in which a piston forms a compression chamber; a port of exit for the fluid in said chamber; a valve yieldably urged to close the port; means for directing fluid pressure against the end of the valve opposite that closing the port; and an inertia mass controlled valve for controlling the fluid pressure at said end of the valve to regulate the flow of fluid from said port.

2. An hydraulic shock absorber comprising, in combination, a casing providing a cylinder in which a piston forms a compression chamber; a port of exit for the fluid in said chamber; a valve; a spring urging the valve to close the port; a receiving chamber behind the valve; a duct in the valve adapted to direct fluid into said receiving chamber; and an inertia mass controlled valve adapted to restrict the flow of fluid from said receiving chamber proportionately to accelerative movements of the casing.

3. An hydraulic shock absorber comprising, in combination, a casing providing a receiving chamber and a cylinder in which a piston forms a compression chamber; a port connecting said chambers; a valve yieldably urged to close the port, said valve having an enlarged portion slidably supported in the receiving chamber and providing a movable wall the space behind which is adapted to receive a flow of fluid from the port; and an inertia mass controlled valve for controlling the flow of fluid from said space to establish a fluid pressure therein in correlation to the accelerative movements of the casing.

4. An hydraulic shock absorber comprising, in combination, a casing providing a fluid receiving chamber and a cylinder in which a piston forms a compression chamber; a port connecting said chambers; a valve yieldably urged to close the port, said valve having an enlarged portion slidably fitting in the receiving chamber providing a movable wall, the space behind which is adapted to receive fluid from the port through a passage in said valve; a port of exit for said space behind the movable wall; a normally open valve for said last mentioned port; and an inertia mass for operating said valve toward closed position in response to and in proportion with accelerative movements of the casing.

5. An hydraulic shock absorber comprising, in combination, a casing providing a cylinder in which a piston forms a compression chamber; a receiving chamber in the casing; a duct connecting the compression and receiving chambers; a valve normally closing the duct, said valve having an enlarged portion slidably supported in the receiving chamber and dividing it into two compartments; a spring urging the valve normally to close the duct; ducts in the valve adapted to provide communication between the compression chamber duct and the compartment on the side of the enlarged valve-portion opposite the compression chamber duct; and an inertia mass controlled valve for regulating the flow of fluid from said compartment proportionately to accelerative movements of the casing.

6. An hydraulic shock absorber comprising, in combination, a casing providing a cylinder in which a piston forms a compression chamber; a receiving chamber in the casing connected with the compression chamber through a passage; a movable member slidably supported in said receiving chamber and dividing it into two compartments, said member providing a valve; a spring urging the member so that its valve portion normally closes the passage; means providing communication between the passage and the compartment more remote from said passage when the valve opens said passage; and an inertia mass controlled valve for regulating the flow of fluid from the last mentioned compartment proportionately to the accelerative movements of the casing.

7. An hydraulic shock absorber comprising, in combination, a casing providing a cylinder in which a piston forms a compression chamber; a port of exit for the fluid in said chamber; a valve yieldably urged to close said port and adapted to be operated by fluid pressure, first to open the port and establish a flow of fluid therefrom and then to be urged toward port closing position to restrict the said established flow of fluid; and an inertia mass controlled valve adapted to control the fluid pressure which urges the valve toward port closing position, proportionately to accelerative movements of the casing.

8. An hydraulic shock absorber comprising, in combination, a casing; means for circulating fluid under pressure through said casing; spring loaded means for controlling said fluid circulation; and an inertia mass controlled device for adjusting said control means in proportion to accelerative movements of the casing by regulating a flow of fluid established by said control means.

9. An hydraulic shock absorber for controlling the relative movements between the body and axles of a vehicle comprising, in combination, a casing providing a cylinder in which a piston forms a compression chamber; a fluid receiving chamber connected with the compression chamber through a passage; a fluid flow control device for the passage comprising, a valve portion and a piston portion adjustably secured thereto, the valve portion, smaller in diameter than the piston portion, normally closing the passage, the piston portion fitting slidably within the receiving chamber and dividing it into two compartments; a duct in the valve portion adapted, when the device is moved by fluid pressure to establish a flow of fluid from the compression chamber, to establish a secondary flow into the compartment on the side of the piston portion more remote from the passage; and an inertia mass controlled valve adapted to restrict the flow of fluid from the receiving chamber in proportion to the accelerative movements of the vehicle body for establishing a pressure in said last mentioned compartment to urge the fluid flow control device forwardly to restrict the flow of fluid from the passage.

10. An hydraulic shock absorber comprising, in combination, a casing providing a cylinder in which a piston forms a compression chamber; an exit port for said chamber; a spring loaded valve normally closing the port, and adapted to be moved in response to piston movement, to establish a main and a secondary flow of fluid from said port, said valve having an enlarged portion against which the pressure of the secondary flow is adapted to act to control the main flow; and an inertia mass controlled device for regulating the secondary flow to determine its fluid pressure.

11. An hydraulic shock absorber comprising, in combination, a casing providing a cylinder in which a piston forms a compression chamber; an exit port for said chamber; a pressure actuated valve having two portions of different areas, pressure acting against the one portion being adapted to actuate the valve to establish a main and a secondary flow of fluid from said port, pressure acting against the other portion being adapted to actuate the valve to restrict the main flow; a check valve for controlling the main fluid flow to build up the secondary flow; and an inertia mass controlled device for regulating the secondary flow.

12. An hydraulic shock absorber comprising, in combination, a casing providing a cylinder in which a piston forms a compression chamber; an exit port for said chamber; a fluid flow control device for said port comprising a valve carried by a slidable piston and yieldably urged to close the port, said device being movable by fluid pressure to open the port and establish a primary flow of fluid from said port around the device; a duct in said device adapted, after the device has been moved to open the port, to establish a secondary flow of fluid through said device; a check-valve adapted to impede the primary flow of fluid from the port to facilitate the establishment of the secondary flow of fluid; and an inertia mass controlled valve adapted to restrict said secondary flow proportionately to accelerative movements of the casing.

13. An hydraulic shock absorber comprising, a casing providing a cylinder in which a piston forms a compression chamber; an exit port for said chamber; a spring loaded differential valve having portions of different areas adapted to be acted upon by fluid pressure to establish and control a flow of fluid from said port; and means including a check valve and an inertia mass controlled valve for establishing forces to adjust said differential valve to vary its control of the fluid flow from the port in proportion to accelerative movements of the casing.

14. An hydraulic shock absorber having an adjustable fluid flow control device provided with means adapted to be acted upon by fluid pressure for adjusting said device to vary its restriction to fluid flow; and an inertia weight controlled means for regulating the fluid flow to build up an effective fluid pressure for adjustment purposes only in response and proportion to the accelerative movements of the shock absorber in one direction.

15. An hydraulic shock absorber comprising a casing providing a cylinder, a piston in the cylinder forming a compression chamber therein; a valve for controlling the flow of fluid from said compression chamber said valve having means adapted to be acted upon by fluid flow from said chamber for adjusting the valve to increase its restriction to the fluid flow; and an inertia weight controlled device adapted to render the valve adjusting means effective only in response and proportionate to accelerations in the movement of the casing in one direction.

16. An hydraulic shock absorber having a plurality of fluid flow control devices for determining the degree of resistance offered by the shock absorber, certain of said devices being effective at lower degrees of fluid pressure than others; adjusting means for adjusting the devices becoming effective at the lower fluid pressures for varying the initial resistance offered by the shock absorber; and an inertia weight controlled device adapted to render said adjusting means effective in response and proportion to accelerative movements of the shock absorber.

17. A hydraulic shock absorber comprising, in combination, a casing providing a cylinder in which a piston forms a fluid displacement chamber; a port of exit for said chamber; and means including separate but cooperating fluid flow control devices, one, a spring loaded valve actuated by fluid pressure to provide a flow both through and around it, the other an inertia weight loaded valve adapted to control the fluid flow through said spring loaded valve in response and proportion to accelerations in the movement of the shock absorber; and means actuated by the pressure of the fluid flowing through said spring loaded valve to effect adjustment thereof to control the fluid flow around it.

18. A hydraulic shock absorber having two paths of fluid circulation, two spring loaded means for controlling the circulation of fluid through the one path in response to fluid pressure; an inertia valve for controlling the circulation of fluid through the other path in accordance with accelerative movements of the shock absorber; and means provided on one of said spring loaded means, adapted to be actuated by and in accordance with the pressure of the fluid flow in said last mentioned path, for adjusting the spring loaded means to increase its restriction to the fluid flow in the first mentioned path.

19. A hydraulic shock absorber having a main and a secondary path of fluid circulation, a spring loaded valve normally closing the main path, but adapted to be actuated by fluid pressure to provide a flow of fluid through the main path, said valve having a duct through which the secondary fluid flow is established after the valve is actuated by fluid pressure; an inertia weight actuated valve adapted to restrict the secondary fluid flow in response to and proportionately to accelerations in the movement of the shock absorber; and means provided on the spring loaded valve adapted, in response to the restriction to the secondary fluid flow, to effect movement of said spring loaded valve to increase its restriction to the main fluid flow.

20. An hydraulic shock absorber having an adjustable fluid flow control device; fluid pressure operated means for adjusting said device; and an inertia weight controlled means for rendering said adjusting means effective only in response and proportion to the accelerative movements of the shock absorber in one direction.

21. An hydraulic shock absorber comprising a casing providing a cylinder, a piston in the cylinder forming a compression chamber therein; a valve for controlling the flow of fluid from said compression chamber; means adapted to be actuated by fluid flow from said chamber for adjusting the valve to increase its restriction to the fluid flow; and an inertia weight controlled device adapted to render the valve adjusting means effective only in response and proportionate to accelerations in the movement of the casing in one direction.

22. An hydraulic shock absorber having a plurality of spring-loaded valves adapted, in response to different fluid pressures, to establish fluid flows within said shock absorber; a fluid actuated adjusting device for the valve requiring the least fluid pressure to open it; and an inertia weight controlled valve adapted, in response and proportion to accelerations of the shock absorber movement in one direction only, to render the adjusting device effective to adjust its valve increasedly to restrict the flow of fluid established thereby.

ALEXANDER G. O. J. MELCHIOR.